(12) United States Patent
Wang et al.

(10) Patent No.: US 10,310,298 B2
(45) Date of Patent: Jun. 4, 2019

(54) SMART SENSOR-COVER APPARATUS AND METHODS AND COMPUTER PRODUCTS FOR IMPLEMENTING SAME

(71) Applicant: GM Global Technology Operations LLC, Detroit, MI (US)

(72) Inventors: Jinsong Wang, Troy, MI (US); Allan K. Lewis, Windsor (CA); Qingrong Zhao, Madison Heights, MI (US); Michael T. Chaney, Jr., Royal Oak, MI (US); Robert D. Sims, III, Milford, MI (US); Wende Zhang, Troy, MI (US); Xiaosong Huang, Novi, MI (US)

(73) Assignee: GM GLOBAL TECHNOLOGY OPERATIONS LLC, Detroit ( * ) Notice: Subject to any disclaimer, the term of this patent is extended or adjusted under 35 U.S.C. 154(b) by 251 days.

(21) Appl. No.: 15/334,136

(22) Filed: Oct. 25, 2016

(65) Prior Publication Data
US 2018/0113331 A1    Apr. 26, 2018

(51) Int. Cl.
*G02F 1/23* (2006.01)
*G02F 1/01* (2006.01)
(Continued)

(52) U.S. Cl.
CPC ....... *G02F 1/0102* (2013.01); *G02B 27/0006* (2013.01); *G02F 1/0136* (2013.01); *B60S 1/56* (2013.01); *G02F 2203/055* (2013.01)

(58) Field of Classification Search
CPC .......... G02F 1/0102; G02F 1/0136; G02F 2203/055; G02B 27/0006; B60S 1/56
See application file for complete search history.

(56) References Cited

U.S. PATENT DOCUMENTS 8,821,043 B2    9/2014 Schutz
9,090,264 B1    7/2015 Zhao et al.
(Continued)

OTHER PUBLICATIONS

Jongwook Kim et al., "Nanocomposite Architecture for Rapid, Spectrally-Selective Electrochromic Modulation of Solar Transmittance", Nano Letters, vol. 15, ACS Publications, 2015, pp. 5574-5579.

(Continued)

*Primary Examiner* — Joseph P Martinez
(74) *Attorney, Agent, or Firm* — Reising Ethington P.C.

(57) ABSTRACT

A smart sensor-cover apparatus for covering a sensor, such as a vehicle sensor, includes controllable layers, responsive to inputs, such as a wavelength-filtering controllable layer to selectively filter out select wavelengths of light; a polarizing layer controllable layer to selectively polarize or allow through light; a concealing controllable layer to change between a visible state and a concealed state; and an outermost, cleaning, layer configured to melt incident ice. The outermost layer in various embodiments has an outer surface positioned generally flush with an outer vehicle surface for operation of the apparatus, to promote the concealing effect when the concealing layer is not activate. The outermost layer may be configured to self-mend when scratched, and in some cases is hydrophobic, hydrophilic, or super hydrophilic outer surface. An insulating component, such as a glass or polycarbonate layer, is positioned between each adjacent controllable layer.

14 Claims, 7 Drawing Sheets

(51) Int. Cl.
  *G02B 27/00* (2006.01)
  *B60S 1/56* (2006.01)

(56) References Cited

U.S. PATENT DOCUMENTS

| | | |
|---|---|---|
| 9,139,204 B1 | 9/2015 | Zhao et al. |
| 2012/0019897 A1* | 1/2012 | Mori .................. G02F 1/167 359/296 |
| 2016/0167669 A1 | 6/2016 | Zhao et al. |

OTHER PUBLICATIONS

Fredrik Kihlborg, "Liquid Crystal Optical Components for Polarization Control in Machine Vision Applications", LC Tec, AP Technologies, Oct. 12, 2015.
Matt W. England et al., "Anti-Fogging/Self-Heaving Properties of Clay-Containing Transparent Nanocomposite Thin Films", vol. 8, ACS Applied Materials & Interfaces, 2016, pp. 4318-4322.

* cited by examiner

FIG. 6

SMART SENSOR-COVER APPARATUS AND METHODS AND COMPUTER PRODUCTS FOR IMPLEMENTING SAME

TECHNICAL FIELD

The present disclosure relates generally to sensing systems and, more particularly, to smart sensor-cover apparatus functional or controllable in various ways to improve sensor performance, and performance, safety, and aesthetics of any host system with which the apparatus is used, such as a vehicle.

BACKGROUND

This section provides background information related to the present disclosure which is not necessarily prior art.

Modern systems such as vehicles rely increasingly on sensors. For vehicles, for instance, they rely on sensors increasingly to support autonomous driving, manual driving, and other functions. Effective sensor use can be important to maximize safety and user experience.

One of the challenges associated with the increasing use of sensors, such as cameras and LiDAR sensors, is their effect on vehicle design. Engineers and designers wrestle with ways to marry the need to incorporate sensors into the vehicle with desired aerodynamics and aesthetics.

To hide sensors, some makers provide vehicles having mechanically movable sensor shields, such as a brand emblem that can swivel or move aside. This solution has many shortcomings, including having relatively low aerodynamics qualities, when the shield is in one or more positions, a high potential for eventual failure of the mechanical components, and an inability for the mechanical cover to move from a blocking to a non-blocking state quickly. As another shortcoming, a mechanical system moving regularly adjacent the sensor may undesirably affect calibration of the sensor over time.

Some vehicle makers try to conceal sensors by positioning them lower on the vehicle, such as at a lower trim or skirt area. Shortcomings of this approach include the sensors still being undesirably visible to people looking at the vehicle, the sensor being more susceptible to getting dirt on its coating, lens, surface, or cover, and the sensor having an undesirably limited view or range for sensing.

Another challenge with sensor systems is that many modern sensors are relatively fragile. Conventional arrangements do not provide any protection between the sensor and the environment sensed.

Still another challenge is ensuring that sensor output is reliable. Many factors affect the ability of sensors to produce accurate, reliable, results. A camera that is configured particularly to best collect image data in daylight conditions will not also be the best camera for nighttime conditions.

Even when a sensor is configured well for prevailing light conditions, output can be misleading when there are temporary environmental characteristics, such as episodes of glare (light reflecting from snow or incident directly from the sun) or shadow (e.g., driving through a tunnel). For these cases, more sensors, of various types, can be used and/or increasingly sophisticated algorithms can be used to account for the characteristics, adding to the cost and complexity of the vehicle.

SUMMARY

The present disclosure describes, by various embodiments, smart sensor-cover apparatus adjustable in various ways to improve vehicle performance, by enhanced sensing abilities, safety, and aesthetics. Sensing is improved by improving the type or quality of light that reaches the sensor, and in some cases when that light reaches the sensor.

Vehicle performance is increased by good aerodynamics and enhanced sensing ability.

In various aspects, the present technology relates to a smart sensor-cover apparatus, including functional or controllable layers, for covering a vehicle sensor. The layers in various embodiments including any of: (i) a wavelength-filtering controllable layer to, in response to input, selectively filter out select wavelengths of light; (ii) a polarizing layer controllable layer to, in response to input, selectively polarize or allow through light; (iii) a concealing controllable layer to, in response to input, change between an opaque, concealable, state and a transparent, visible state; and (v) an outermost, cleaning, layer configured to, in response to input, melt ice or snow incident on the apparatus.

The outermost layer in some implementations has an outer surface that is positioned, for operation of the apparatus, generally flush with an outer vehicle surface, to promote the concealing effect when the concealing layer is in a concealing mode.

The outermost layer may have a surface configured to self-mend, or self-heal, when scratched, abrased, or similarly injured at the surface.

The outermost layer in some cases includes an outer surface that is hydrophilic, hydrophobic, or super or ultra hydrophilic or hydrophobic. References to hydrophilic and hydrophobic herein, include the super or ultra types.

An insulating component, such as a glass layer, is positioned between each adjacent functional or controllable layer, such in implementations in which the controllable layers laminated or stacked with the insulating layer sandwiched there between.

Various aspects of the present technology include non-transitory computer-readable storage devices, processing units, and algorithms configured to perform any of the operations described.

Other aspects of the present technology will be in part apparent and in part pointed out hereinafter.

DESCRIPTION OF THE DRAWINGS

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, smart sensor-cover apparatus controllable in one or more ways to improve sensor and vehicle performance and safety.

Sensor performance is improved by enhanced sensing abilities, safety, and aesthetics. Sensing is enhanced by an improved type or quality of light allowed to reach the sensor, and in some cases, a timing by which that light can reach the sensor.

The smart sensor-cover apparatus is positioned adjacent a vehicle sensor, such as a camera, LiDAR, RADAR, etc. The apparatus can be part of, connected to, or simply positioned adjacent a sensor system or package.

In various embodiments, an outer surface of the sensor-cover apparatus is positioned flush or generally flush with an adjacent outer surface of the vehicle on which the sensor and apparatus are installed.

In various implementations, the sensor-cover apparatus includes a plurality of coating, lenses, or layers electrically isolated from each other, each being configured to, in response to selective provision to the layer of an input voltage, exhibit a quality unique to the layer. Insulation, or an isolation layer, can include fully transparent glass or polycarbonate layers or lenses, for instance.

In other implementations, at least two of the controllable layers are not separated by an insulation, or isolation, layer. We can configure the voltage input/wiring so that a layer's cathode can also act as next layer's anode. By carefully configure the voltage input pattern, we can apply desired voltages on different layers.

Example layer qualities include polarization, near-infra-red/visible-spectrum filtering, and concealability, as described further below.

In various embodiments, an outermost layer is configured with one or more characteristics of (i) an ability to keep an outer surface of the layer clean of ice and snow, (ii) being hydrophobic super or ultra hydrophilic, and (iii) being self-healing, or able to automatically (e.g., without external input such as voltage) fully, largely, or at least partially mend its structure following being compromised, such as by a scratch, abrasion, gouge, etc. to the surface.

In various embodiments, the layer having an ability to clean by heating to remove or avoid development or presence of ice and snow is not an outermost layer of the apparatus 130.

While select examples of the present technology describe transportation vehicles or modes of travel, and particularly automobiles, the technology is not limited by the focus.

The concepts can be extended to a wide variety of systems and devices, such as other transportation or moving vehicles including aircraft, watercraft, trucks, busses, trolleys, trains, commercial or manufacturing equipment (for example, a forklift), construction machines, and agricultural machinery, warehouse equipment, office equipment, home appliances, personal or mobile computing devices, such as phones, wearables, and wireless peripherals, the like, and other.

Example wearables include but are not limited to smart eye glasses, a smart watch, smart apparel, such as a shirt or belt, an accessory such as arm strap, or smart jewelry, such as necklaces and lanyards, or (selectively stealth) law enforcement-officer wearable equipment.

Also, while select examples of the technology describe externally directed sensors, such as where the subject apparatus is positioned at an outer surface of a vehicle, the concepts disclosed can be extended to interior uses, such as internally focused cameras or motion detectors sensing characteristics in a cabin or body of a vehicle or piece of equipment.

While select examples of the technology describe use at an opaque body surface of a vehicle, the concepts can be extended to other systems, such as windows of a building such as a house or vehicle, such as a windshield. The resulting system, including the smart sensor-cover apparatus, can be referred to as a smart window or smart windshield, for example.

II. Visible Mode of Smart Sensor-Cover Apparatus—FIG. 1

Figure 1:
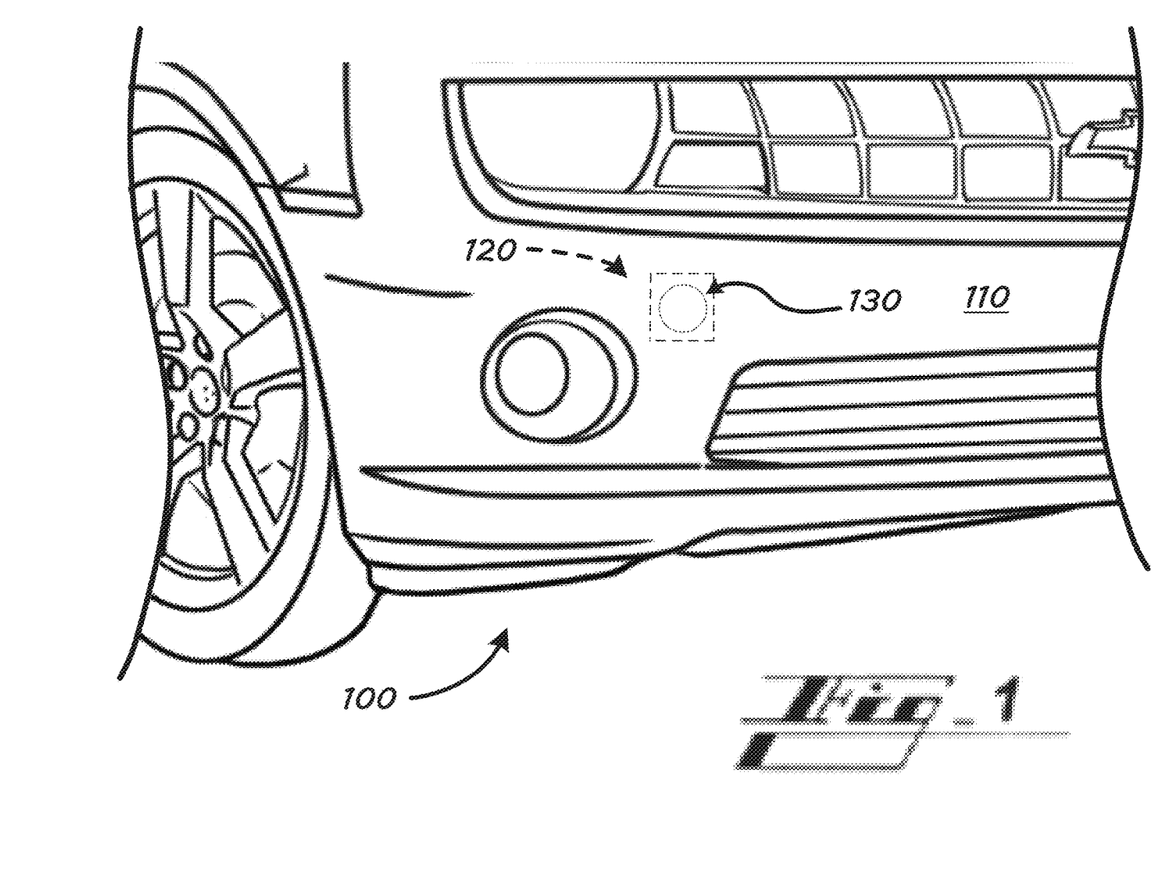
FIG. 1 illustrates schematically an example vehicle of transportation having an embodiment of the smart sensor-cover apparatus of the present disclosure installed thereon and in a visible mode.

Turning now to the figures and more particularly the first figure, FIG. 1 shows schematically an example vehicle of transportation 100 having an embodiment of the smart sensor-cover apparatus 130 installed thereon.

The smart sensor-cover apparatus 130 is connected to, includes, or is part of a vehicle sensor package or device 120, such as a camera, LiDAR, or RADAR sensor, as just a few examples.

In contemplated embodiments, not shown in detail, the sensor can be a camera or other sensor positioned in a rear-view mirror of the vehicle 100, or other interior-vehicle surface, facing the vehicle interior or cabin, for sensing characteristics of the cabin.

On the other hand, world-facing sensors sense characteristics about an environment comprising pedestrians, other vehicles, traffic signs, traffic lights, road conditions, obstacles billboards, buildings, etc.

In a contemplated embodiment, at least one subject sensor is configured (having materials and structure) and arranged (positioned or located and connected to adjacent structure) to be used to authenticate a user of the vehicle who is in, at, or arriving to the vehicle 100.

Sensor output data relates in various embodiments to any of a wide variety of vehicle, user, or environmental characteristics such as to vehicle operations, vehicle position, and vehicle pose, user characteristics, such as biometrics or physiological measures, and environmental-characteristics pertaining to a vehicle interior or outside of the vehicle 100.

In various embodiments, the smart sensor-cover apparatus 130 is configured to be operated selectively in a concealed, hidden, or less-visible, mode versus a visible mode, based on whether a transformable layer is caused to be opaque or more opaque versus transparent or less opaque. In one of these embodiments, FIG. 1, the smart sensor-cover apparatus 130 would be in the visible mode, which is why the apparatus 130 can be easily seen in FIG. 1.

In some cases, the smart sensor-cover apparatus 130 can be seen while it is in the concealed or less-visible mode. As an example, the smart sensor-cover apparatus 130 becomes less-visible, but is still visible, by a selectively concealing controllable layer of the apparatus (e.g., layer 216 of FIG. 2) being controlled to change from transparent to grey adjacent a black or other non-grey-colored vehicle body panel 110.

In some implementations, it is preferred that the smart sensor-cover apparatus 130 is configured to become substantially unnoticeable to eye, and especially a casual viewer of the vehicle 100, when the smart sensor-cover apparatus 130 is in the concealed mode. This can be accomplished, for instance, by changing the selectively concealing controllable layer to have one or more visual characteristics—color, patterning, texture and/or other visual characteristics—matching the visual characteristic(s) of the adjacent vehicle body panel 110.

III. Exploded View of Smart-Cover Apparatus with Sensor—FIG. 2

Figure 2:
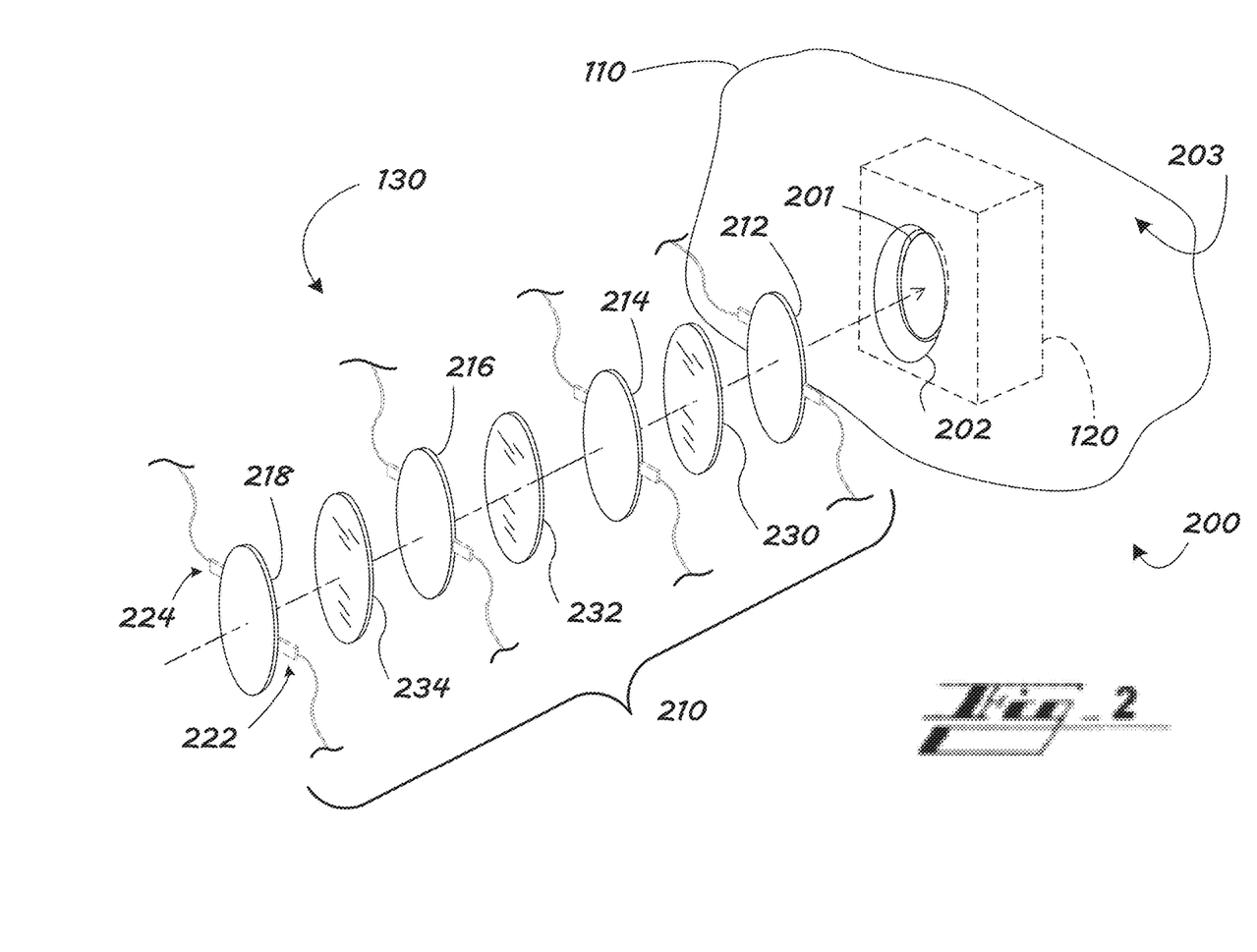
FIG. 2 illustrates schematically more details of the example sensor-cover apparatus of the present technology.

FIG. 2 illustrates a system 200 including the sensor 120 and components of the example smart sensor-cover apparatus 130 in exploded view. The apparatus 130 is shown adjacent the body panel 110 of the vehicle 100.

The sensor 120 is in various embodiments positioned with respect to the vehicle body panel 110 in any of a variety of ways. The sensor 120 may be positioned adjacent, such as behind, the panel 110, as shown in FIGS. 1 and 2, and may be connected directly or indirectly to the panel 110.

In some embodiments, the sensor 120 includes a sensor interface or opening 201, such as a lens cover or lens-cover frame.

Smart sensor-cover apparatus 130 components include a plurality of coatings, layers, surface, and/or lenses 210. The layers 210 are in various embodiments preferably thin. As an example, each lens can have a thickness 301 (FIG. 3) of between about 10 μm and about 2 mm.

And while the lenses can have other widths or diameters, in various embodiments each lens has a width or diameter measuring between about 10 mm and about 50 mm, in some cases, such as, but not limited to use with a camera as the sensor, or up to about 200 mm in some cases, such as with, but not limited to, use with a LiDAR sensor, which would likely have a larger-diameter sensing surface.

In most cases the concealment function would require a single coating or film laminated to or within a lens or on a surface adjacent to a lens. The system is not necessarily a multi lens system. In many cases additional lensing would have a potentially negative effect.

In various embodiments the stack can be referred to as a laminate.

One or more of the layers 210 is controllable, or configured with at least one quality that can be changed selectively in response to a predetermined actuating input, such as, but not limited to, an input voltage.

In the example of FIG. 2, the controllable layers include a first controllable layer 212, a second controllable layer 214, a third controllable layer 216, and a fourth controllable surface or layer 218. While four controllable layers are shown by way of example, the smart sensor-cover apparatus 130 includes more or less controllable coating, layers, or lenses in other embodiments.

The controllable layers are insulated from each other in one or more ways, such as electrically, so that input such as voltage provided to one of the controllable layers does not reach or affect performance of the one or more adjacent controllable layers. FIG. 2 shows example insulation, or isolation, in the form of insulation layers 230, 232, 234.

Insulation, whether in the form of coating, lenses, and layers, or other, may include glass or polycarbonate. Glass and types of polycarbonate have benefits for this insulating role including being able to block voltage transfer between adjacent layers while remaining transparent to allow all types (wavelengths, etc.) of light to pass through it on route to the sensor 120.

If a material is used as an insulator by spanning between adjacent faces of adjacent layers, the material in various embodiments would preferably have the qualities mentioned for glass—that is, being transparent, to allow light to pass freely, while isolating adjacent controllable layers from each other electrically. Other insulators may be used instead of or along with glass. Rubber or other material nibs, legs, braces, or other structures (not shown) may be positioned between layers, around portions or an entirety of an edges of adjacent layers.

In a contemplated embodiment, such structure separates adjacent layers, and air is used to form at least part of the insulation separating adjacent controllable layers.

In operation, input, such as electrical input or voltage, is provided to the controllable layers 212, 214, 216, 218 by way of respective input componentry. The input controls characteristics, and so the performance, of the apparatus 130.

In the example of FIG. 2, the inputs include input connectors 222, 224, such as cathode, anode connectors. While only one set of connectors 222, 224 is labeled in FIG. 2 to avoid obscuring the view, it can be seen that a set of connectors is connected to each of the controllable layers.

The connectors 222, 224 include or are in turn connected to input wires, which can carry voltage, current, or electrical charge to, or to and from, the controllable layers 212, 214, 216, 218.

The body panel 110 can be solid or hollow. In various embodiments, the body panel 110 includes, or has formed in it, an opening or void 202. A furthest-out, or "A", surface of the body 110 is labeled 203. The surface is in some embodiments simply an exposed or visible surface, whether furthest out in the area—an exposed or visible surface with which embodiments of the apparatus 130 will blend with, or be concealed at.

In various embodiments, the outermost coating, layer, or lens, such as layer 218, is positioned in the smart sensor-cover apparatus 130, and the smart sensor-cover apparatus 130 arranged with respect to the panel 110, so that the outer-most layer 218 of the apparatus 130 is fully or generally flush with the outer surface 203 of the panel 110. In this way, the smart sensor-cover apparatus 130 does not negatively affect vehicle aerodynamics, and the apparatus 130, and so the sensor 120, is more stealth, especially for embodiments in which the smart sensor-cover apparatus 130 can assume the concealed mode.

The controllable layers 212, 214, 216, 218 can be arranged in various order and each can be configured to perform any one or more of the functions described herein.

In one example, the controllable layers include:
a near-infrared/visible light filter layer 212;
a polarization layer 214;
a concealing layer 216; and
a protecting, cleaning, and/or self-healing layer 218.

III.A. Near-Infrared/Visible Light Filter Layer

The near-infrared/visible-light filter coating, lens, or layer 212 is configured to automatically change, or Vis/NIR control, an amount of near-infrared and/or visible light blocked or allowed to pass through the sensor-cover apparatus and on to the sensor 120.

Function of the layer 212 (Vis/NIR control) improves sensor output in various lighting conditions, such as in day and night driving, by allowing as input to the sensor 120 only light determined most useful to the sensor 120 under the present conditions.

The near-infrared/visible-light filter layer 212 is controlled based on the present ambient lighting conditions—e.g., bright, light, dark, relatively dark, shadow, etc.

The control may be performed by a processor, such as that described below in connection with FIG. 4. In a contemplated embodiment, control is performed by a circuit including another sensor, sensing brightness for instance. An amount of light sensed by the light sensor controls an amount of voltage or current provided to the near-infrared/visible-light filter layer 212. The processor or circuit can be connected to, or include, a switch, affecting the amount of voltage or current provided to the near-infrared/visible-light filter layer 212, such as the switch 440 of FIG. 4.

Figure 4:
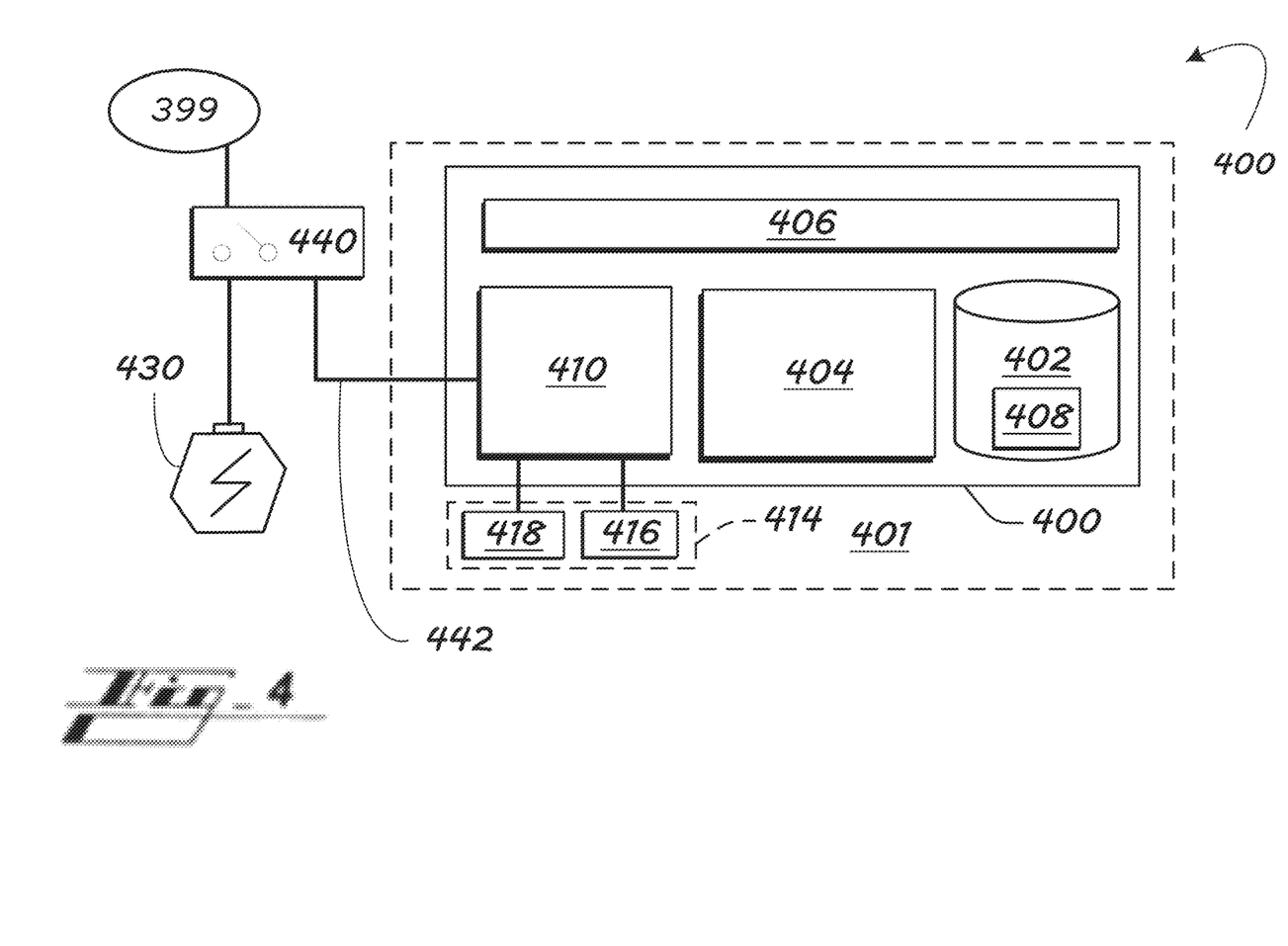
FIG. 4 shows a voltage source, a switching component, and a computing system used in the present technology.

A voltage or electrical source is indicated by reference numeral 430 shown in FIG. 4.

In various embodiments, the near-infrared/visible-light filter layer 212 is controlled to (i) perform IR filtering in light, or daytime, conditions, and (ii) allow IR light to pass in darker or night conditions to get more light in for clear image.

Benefits of the light or daytime mode include improved—e.g., more-accurate—color rendering by the sensor 120 based on the IR-filtered light allowed through to the sensor 120.

Benefits of the dark or nighttime mode the sensor 120 rendering a clearer image, than would otherwise be achievable, based on IR light allowed to pass through to the sensor 120.

Figure 6:
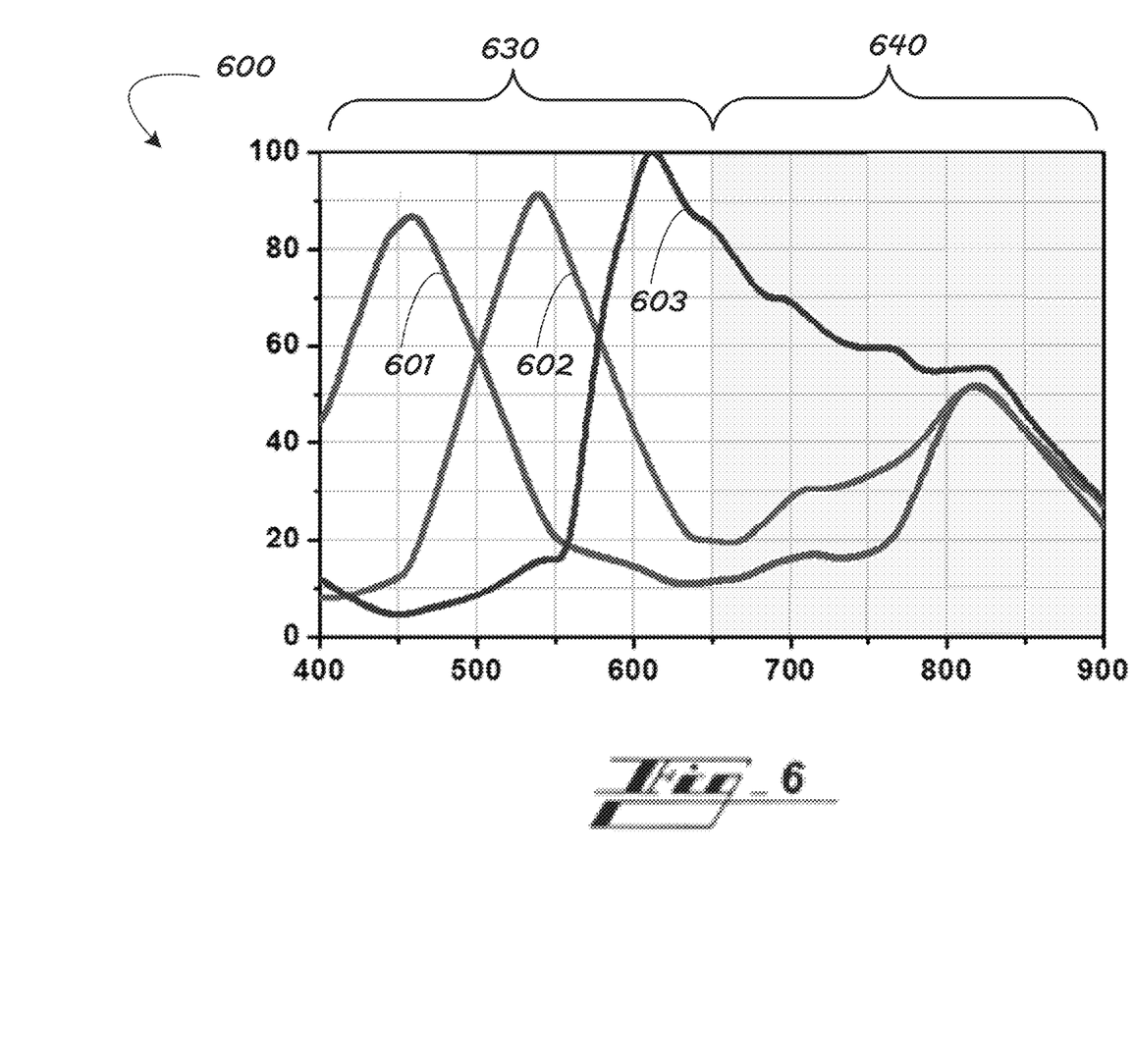
FIG. 6 shows a chart of light data at different wavelengths.

Reference is now made to FIG. 6. The figure shows an image-sensor-response chart 600. The x-axis 610 represents wavelength measured in nanometers (nm), and the y-axis 620 represents percentage (%) of relative transmittance of the color filter on image sensor. Values for blue color filter 601, green color filter 602, and red color filter 603 are shown, being the three components, or three main components, of an image sensor color filter.

The chart 600 shows visible-light (VIS) wavelength (about 400 to about 680 nm) and near-infrared (NIR) wavelength (about 680 nm to about 900 nm or higher).

The VIS/NIR filter layer 212 is in various embodiments configured to, depending on the input voltage provided to it at any one time, allow through only light having wavelength within one of two or more pre-set corresponding ranges. Ranges can overlap. While the ranges can be separated at other points, in various embodiments the wavelengths are separated into two ranges generally about 650 nm: a lower range referenced by numeral 630 in FIG. 6 which represents the visible light and an upper range referenced by numeral 640 which represent the NIR range.

As mentioned, the VIS/NIR filter layer 212 can be controlled to (i) perform IR filtering in light, or daytime, conditions, and (ii) allow IR light to pass in darker or night conditions to allow more light to the sensor for forming a clearer image. Benefits of the light or daytime mode including improved—e.g., more-accurate—color rendering by the sensor 120 based on the IR-filtered light allowed through to the sensor 120. Benefits of the dark or nighttime mode include rendering by the sensor 120 of a clearer image based on IR light allowed to pass through to the sensor 120.

In application, the VIS/NIR filter layer 212 is controlled to allow light in the first range 630 through to the sensor 120 during daylight or light times, while blocking light in the second range 640, and to allow light in both the first range 630 and the second range through to the sensor 120 during nighttime or darker times.

The VIS/NIR filter layer 212 can include any of a variety of materials to perform accordingly. An example is a composite material, such as a nanocomposite. The layer 212 can include two active electrochromic materials, vacancy-doped tungsten oxide (WO3-x) nanocrystals and amorphous niobium oxide (NbOx) glass are arranged into a mesostructured architecture.

III.B. Polarization Layer

The polarization coating, lens, or layer 214 is adjustable to change its characteristics to control an amount of light polarization provided by the layer 214 to light arriving the layer 214, based on input such as input voltage provided to the layer 214, at a predetermined level and at a predetermined timing.

In operation, the polarization layer 214 mitigates effects of glare, incident on the apparatus 130, on the sensor 120. The polarization layer 214 can also enhance the ability of the sensor 120 to detect items or conditions in the environment. As just one example, the polarization layer 214 can enhance the ability of the sensor 120 to detect particular road conditions that would otherwise be difficult to detect, or accurately characterize, such as some wet road-surface conditions.

In various embodiments, a designer of the system, in structuring the apparatus or the algorithm or code used to control it, may consider a polarization difference factor. An example polarization difference can be represented by (pixels intensities vertical–pixels intensities of parallel)*2, or PD=(PIV–PIP)*2.

In various embodiments, the polarization layer 214 includes liquid crystal optical components for polarization control. Other example materials include nanorods, or a wire-grid polarizer, or a suspended particle devices (SPD) polarizer.

In various embodiments, the layer 214 is configured with polarizing components to filter out light arriving to the layer 214 at select angles. The layer 214 can be configured and activated in one manner (e.g., input voltage amount) to filter out first light components (light of the first type) while allowing another component of the light (light of the second type), having the perpendicular qualities with respect to the first light components, to pass. Or the layer 214 can be activated to filter out light of the second type while allowing light of the first type to pass.

In contemplated embodiments, the polarizing layer 214 can be activated at different timing or lighting condition. For instance, the layer 214 can be active at time t, and be inactive at time t+1. The difference between the video frames from time t and time t+1 can be used to detect and identify one or more glaring spots or apparently wet conditions, and thereby reduce glare or detect road surface wet/dry condition.

Control of input to the polarization layer 214 from a voltage source can be like that described for other layers herein. For instance, the control may be performed by a processor, such as that described below in connection with FIG. 4. And in a contemplated embodiment, control is performed by a circuit including another sensor, sensing brightness or other quality, such as glare, for instance, a precipitation sensor (adjacent windshield, for instance) or a wet-road detection system, such as tire-slip detection system. The processor or circuit can be connected to, or include, a switch, affecting the amount of voltage or current provided to the polarization layer 214 and, thereby, orientation of the polarization. Whether controlled by a processor and circuit or a more simple circuit alone, voltage can be provided by a voltage or electrical source, such as the source 430 shown in FIG. 4.

III.C. Concealing Layer or Surface

The concealing surface or coating, lens, or layer 216 in various embodiments is or includes an electrochromic coating, lens, layer, or surface.

While this component 216 can in some embodiments be considered more as a coating, lens, or surface, it is referred to primarily herein as a layer to simplify this disclosure.

The concealing layer 216 in various embodiments includes an electrochromic polymer dispersed liquid crystal (PDLC). The PDLC is in some implementations configured as a suspended particle device (SPD). Electrochromic devices, suspended particle devices, and polymer dispersed liquid crystal devices are independent technologies that could be applied as a film or surface lamination for providing the concealment function. Each would be electrically controlled—in the case of electrochromic devices, applied voltage causes a change in the light transmission properties of the material itself, such as the material changing from translucent to opaque. In PDLC or SPD applications, applied voltage results in alignment (or misalignment depending on the default or prior state) of particles or crystals to allow (or disallow) transmittance of light. When no voltage is applied the orientation is random resulting in blockage or scattering of light.

In a contemplated embodiment, the particles or crystals are default (without voltage) misaligned, in which state the light is blocked or scattered, and with voltage they become aligned, in which state light is transmitted.

The concealing layer 216 is adjustable between a visible mode or state and an opaque mode or state depending on input to the layer, such as a voltage. The visible mode—in which, the sensor 230 is more visible to onlookers—allows most or all (100%) light to pass through and on to any underlying/behind layers of the smart sensor-cover apparatus 130, and on to the sensor 102.

In contemplated embodiments, the smart sensor-cover apparatus 130 is configured to be in the opaque mode by default. The concealing layer 216 stays in its opaque state, without controlling input being provided to it, and changes to being transparent in response to an input, such as a predetermined input voltage.

In various embodiments, the concealing layer 216 is controlled to be in the opaque mode when the sensor 120 is not sensing, and transparent mode when it is. Sensors 120 can, but need not for every implementation, be configured to change very quickly between sensing and not sensing. A modern sensor may switch between sensing and not sensing many times per second for instance, such as 30 times per second or faster.

In various embodiments, it is preferred that the smart sensor-cover apparatus 130 be configured to change from its concealed mode to its visible mode, and back to the concealed mode, in connection with each such sensor actuation for a single sensing. Thus, the concealing layer 216 transition would need to occur very fast, such as 30 times per second or faster, for instance. For this, the layer 216 is configured to quickly change in response to a discrete voltage input (in by input component 222, for instance), and to dissipate or release voltage quickly (out by output component 224, for instance).

Materials are known that can be used to accommodate this quick-changing performance need. However, many such materials have a shortcoming of relatively short lifetime. An ideal quick-changing material would preferably be robust enough to last long, such as as long as an expected life of the vehicle or other system at which the smart sensor-cover apparatus 130 is implemented.

Provision of the input—e.g., voltage—is thus in some implementations provided generally in synchronization with operation of the sensor to collect light for, e.g., an image or other sensor data to be formed. The controlling component(s) can receive data from the sensor or program controlling the sensor indicating when the sensor is or is about to be collecting data, and provide actuating input to the concealing layer 216 accordingly.

Controlling input to the concealing layer 216 can be performed by the circuit or processor, such as that described below in connection with FIG. 4. In a contemplated embodiment, control is performed including another sensor, sensing brightness or other quality, such as glare, for instance, a precipitation sensor (adjacent windshield, for instance) or a wet-road detection system, such as tire slippage detection system. The processor or circuit can be connected to, or include, a switch, such as the switch 440 shown in FIG. 4, affecting the amount of voltage or current provided to the concealing layer 216. Whether controlled by a processor and circuit or a more simple circuit alone, voltage can be provided by a voltage or electrical source, such as the source 430 shown in FIG. 4.

The concealing layer 216 can be used to partially or fully disguise the apparatus, and so the sensor 120, from view. The layer 216 can be configured to change from transparent or less opaque to an opaque or more-opaque surface appearing in one or more ways (color, texture, patterning, and/or other visual characteristics) like the vehicle exterior surface adjacent the apparatus. In some cases, though, the smart sensor-cover apparatus 130 can still be seen by viewers while it is in the concealed, or less-visible mode. In these cases, the smart sensor-cover apparatus 130 becomes less-visible, such as by becoming black, but still being visible against non-black-colored vehicle body panel 110.

In implementations, it is preferred that the smart sensor-cover apparatus 130 becomes substantially unnoticeable to eye, and especially a casual viewer of the vehicle, when the smart sensor-cover apparatus 130 is in the concealed mode, such as by changing to have one or more visual characteristics (color, texture, patterning, and/or other visual characteristics) matching the visual characteristic(s) of the adjacent vehicle body panel 110.

When the vehicle 100 has a maroon body piece 110 adjacent the concealing layer 216, for instance, the concealing layer 216 can be configured to form the same maroon color when the input—or lack of input when opaque is the default mode—causes the concealing layer 216 to be in the opaque or concealed mode.

III.D. Protecting, Cleaning, and/or Self-Healing Layer

This coating, lens, layer, or surface 218 is in various embodiments configured with one or more characteristics, such as (i) an ability to keep an outer surface of the layer clean of ice and snow, (ii) being hydrophobic, hydrophilic, or super or ultra hydrophilic or hydrophobic, and (iii) being self-mending, or able to fully, largely, or at least partially mend its structure following a scratch, abrasion, gouge, or other injury to the surface.

While the element 218 can include a coating, lens, layer, or surface, the element is described primarily here as a layer for simplicity of the present disclosure.

The layer 218 is also transparent, so as not to obscure light traveling through it on route to the sensor 120.

By the cleaning functions, the layer 218 promotes safety actively by improving the amount and/or quality of light entering the sensor 120. This safety functions is in addition to the referenced active safety benefits provided by the other layers—e.g., Vis/NIR filtering layer 212 and polarization layer 214—which improve, or affect (e.g., polarize) as desired, the light passing through the smart sensor-cover apparatus 130 and on to the sensor 120.

The cleaning function improves light entering the sensor by avoiding conditions at the layer 218, such as droplets, dirt, or scratches, which would otherwise obstruct, skew or otherwise undesirably affect light incident at the layer 218.

With better quality of light—e.g., without glare, or only with the wavelengths expected to be most useful under the present lighting conditions—the sensor 120 can perform better and so based on sensor output more safely the vehicle can be operated.

The layer 218 is configured in various embodiments to heat up in response to receiving an input current or voltage. When heated, the layer 218 can keep snow and ice from collecting or forming on the smart sensor-cover apparatus 130—e.g., on the layer 218 or any further-out layer of the smart sensor-cover apparatus 130. Or the layer 218 can when heated melt away any snow or ice already present on the apparatus 130. These abilities constitute at least part of the cleaning function of the layer 218.

In some implementations, the layer that is configured to heat up for cleaning purposes (removing or avoiding development of ice and snow) is not an outermost layer of the apparatus. And this layer can also be configured to perform any of the other functions described herein, such as polarization or VIS/NIR filtering.

The layer is configured in various embodiments with material at its outer surface, being the outermost surface (or, "A" surface) of the smart sensor-cover apparatus 130, that is hydrophilic, or a so-called ultra- or super-hydrophilic. A hydrophilic or super-hydrophilic surface is configured so that moisture, such as water, that contacts the surface spreads very thinly across the surface, promoting evaporation or drying out of the moisture. When spread thinly, versus forming droplets, the moisture is less obtrusive to light proceeding into and through the smart sensor-cover apparatus 130 and on to the sensor 120. Very small droplets can together constitute unwanted fogging or otherwise blur the surface on which they are formed.

Hydrophobic surface tend to repel moisture, thereby, for instance causing moisture arriving at the surface to roll away, and so not block sensor view through the apparatus 130.

Hydrophilic surfaces tend to attract moisture that comes into contact with it, as compared to hydrophobic surface that repel the moisture. Hydrophilic surface can thus be said to have a special affinity for moisture or water, causing the moisture to spread across maximum area of the surface around the point or area of contact, thereby maximizing contact. The hydrophilic nature is based on chemistry of the surface material. One manner of making a surface ultra- or super-hydrophilic is by appropriate nanopatterning.

By some standards, a surface is characterized as being hydrophilic or hydrophobic based on a contact angle formed by a moisture or water drop contacting the surface, or an angle between a droplet's edge and the surface underneath it. On hydrophilic surfaces, a water droplet spreads, wetting a relatively large area of the surface, and so the contact angle is less than, and usually much less than, ninety degrees. This ability constitutes at least part of the cleaning function of the layer 218.

Regarding self-healing, the surface or layer 218 is in various embodiments configured to fully, mostly, or at least partially mend its structure automatically after being scratched, abrased, gouged, etc. In various implementations, the material is configured to do this automatically, without input—e.g., input current or voltage.

In a contemplated embodiment, the material is configured so that input, such as current or voltage provided to the layer also to melt ice, promotes the healing process, to mend the layer from any scratches. Scratches may occur by ice, snow, dirt, rocks, or removal of snow or ice, by a person or vehicle wiper, for instance.

In these embodiments, the layer 218, and so the smart sensor-cover apparatus 130 can be considered scratch resistant in that though a scratch may form, the effect of the scratch, is timely mended.

By being present, and also by being mendable, or able to heal itself, the layer 218 provides a robust physical protection for the sensor 120 that does not need to be replaced often if ever. This is helpful for all sensors, and especially more fragile sensors. Some LiDAR sensors have a fragile cover or other part(s), which can be relatively expensive, and so protecting them is important.

By being robust, including in some embodiments being self-healing, the layer 218 is better able to be cleaned by external input, such as spraying a cleaning solution or water on the layer 218, brushing the layer 218, or wiping the layer with a wiper system (not shown) positioned adjacent the outermost surface (e.g., present, protective layer 218) of the smart sensor-cover apparatus 130. The wiper can be mounted on the body 110 of the vehicle 100, for instance. In a contemplated embodiment such wiper system is connected to or part of the apparatus 130.

In some implementations, it has been found that having a curved surface, such as slightly convex or slightly concave, improves function of this layer 218. And the layer can be flush with the outer surface 203 of the vehicle body 110 and/or integrated into (e.g., connected directly to, with little to no apparent intervening gap, or formed as part of) the adjacent vehicle body 110. These structural aspects, such as the flushness, layer curvature, integration or minimized gapping, for instance, can improve layer functions such as any of the hydrophilic functions, the snow/ice melting functions, and the ease or effectiveness by which the layer can be sprayed, brushed, wiped, or the like.

Benefits of having the protections afforded by this layer 218, in addition to protecting the sensor-cover apparatus 130, including possibly reducing the need, material, work, and general cost associated with needing to weatherproof the sensor 120 and/or apparatus 130 can otherwise reduce the need, material, work, and general cost associated with packaging for the sensor 120 and/or the smart sensor-cover apparatus 130.

For the various potential functions, then, the layer 218 can include any of multiple materials.

For heating purposes, an example material for use in this layer 218 is a coating of Indium Tin Oxide (ITO). Such coating can be used for purposes of defrosting, as well, at the layer 218 and so for smart sensor-cover apparatus 130.

For the self-healing, the surface can be hydrophilic, hydrophobic, or ultra- or super-hydrophilic or phobic by appropriate nanopatterning, as mentioned.

An example material for inclusion in the layer 218 is polycarbonate. The material in some embodiments includes a conductive polymer coating, which can be especially useful for the heating to remove or blocking snow and ice.

For snow or ice removal or blocking, the material is configured in some implementations so that temperature can be increased to a temperature over 0 degrees C. within a few seconds, such as in response to an input voltage. In just one testing, the threshold temperature was 100 degrees C. Any of a variety of voltage levels can be used depending on, for instance, the materials used between and including the voltage source and the heated lens, layer, surface, or coating. Example voltages range from, but are not limited to the range of, 12V and 110V.

The layer 218 in various embodiments includes a water-soluble polymer, such as polyacrylic acid, polyvinyl alcohol, or polyvinylpyrrolidone with graphene or carbon nanotube additives. The layer 218 in some embodiments is or includes a polymer nanocomposite thin film, such as a polymer and clay containing transparent nanocomposite thin film. The layer can include such a film prepared on any of various substrates such as glass or silicon. The film can be provided by spin-coating, such as spin-coating a mixture of polyvinylpyrrolidone and aminopropyl-functionalized nanoscale clay platelets, rendering a hydrophilic or phobic, or ultra- or super-hydrophilic or phobic, surface that can also self-heal. In some embodiments, self-healing can also be achieved by incorporating into the materials chemistries that can undergo reversible chemical reactions under different stimuli, such as in response to UV, moisture, temperature, or visible light.

In some embodiments, the layer 218 includes, or is coated with a surface treatment of, a silane containing material. Two example surface treatments are:
(i) a layer surface being silane- or plasma-treated to introduce amine groups, and then subjected to successive spin coating of (poly(ethylene-maleic anhydride) (PEMA) and poly(vinyl alcohol) (PVA) layers; and
(ii) a layer surface being silane containing isocyanate groups, and subjected to successive spin coating of PVA or PAA. Isocyanate can form chemical bonds with PVA or PAA to improve the coating durability.

Example purposes of the first version (i) include improving adhesion—the amine group promotes attachment. to and so between adjacent controllable layers—e.g., functional polymer layers. The anhydride in PEMA poly(ethylene-alt-maleic anhydride) reacts with amine chemically to achieve a strong bonding to the adjacent controllable surface or lens. PVA has good adhesion characteristics with respect to PEMA due to hydrogen bonds. Also, one or more of the controllable layers can be or include PVA.

Example purposes of the second version (ii) include isocyanate providing anchoring points for the polymer coating layer. PVA and PAA can chemically react with anhydride to form a strong adhesion for connecting to, or connecting, the adjacent controllable or function layer(s). PVA (PAA) and other polymers can also absorb water, whereby polymer molecules can move and induce formation of entanglements, which creates or promotes the self-healing function And as mentioned, reversible chemical bonds can also be used as entanglement to be or promote the self-healing functions.

The following is an example structure for the coating:

Amino groups provide the anchoring points to the functional polymer layer to achieve robust adhesion.

IV. Cross-Sectional Side View of Apparatus with Sensor—FIG. 3

Figure 3:
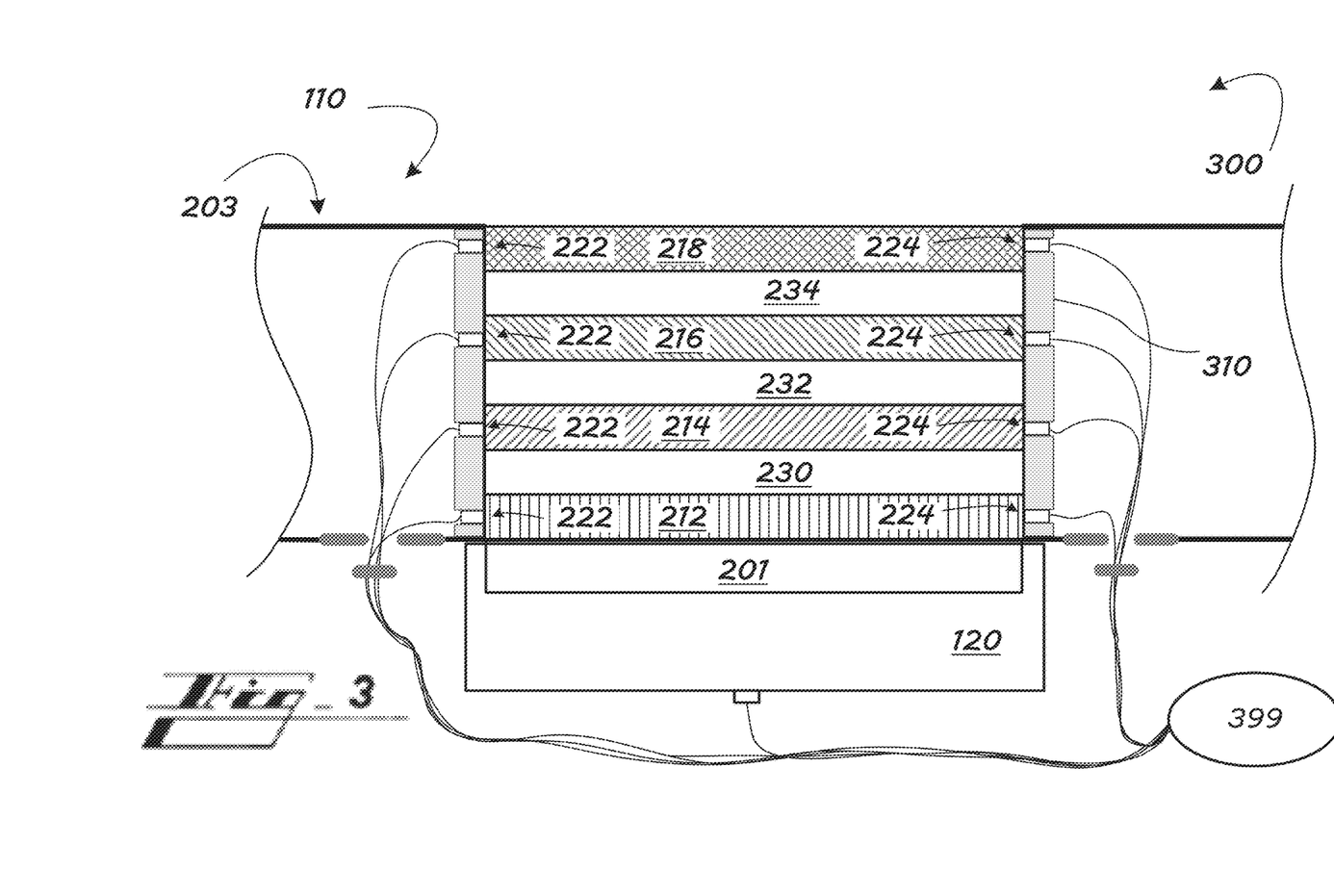
FIG. 3 shows a side cross section of the components of FIG. 2.

FIG. 3 shows a side cross-sectional view 300 of the components of FIG. 2.

The view 300 also shows an optional smart sensor-cover body 310. The body 310 can have any suitable configuration (material, etc.) and arrangement (positioning within or at the apparatus 130) to perform functions such as holding layers together, protecting the layers, and acting as a connection point between the apparatus 130 and vehicle 100 or sensor 120.

Other components have the same numbering as FIG. 2.

A transfer oval 399 indicates a connection that is continued in FIG. 4.

V. Voltage Source, Switching Component, and Processor—FIG. 4

FIG. 4 shows a system or sub-system 400 including a voltage source 430, a switching component 440, and a computing device 401 used in the present technology.

The system 400 of FIG. 4 is connected schematically to the smart sensor-cover apparatus 130 of FIG. 3 by the transition oval 399 shown in both figures.

The computing device 401 controls an amount and/or timing of provision of voltage from the voltage source 430 to the one or more controllable layers 212, 214, etc., of the smart sensor-cover apparatus 130.

In various embodiments the switch 440 is configured to be controlled by the computing device 401 to control the amount and/or timing of voltage being provided to various parts of the smart sensor-cover apparatus 130.

In contemplated embodiments, the switch 440 is connected directly to the smart sensor-cover apparatus 130 or the switch 440 is part of the apparatus 130.

The computing device shown can be an example hardware-based computer or computing system, for use in accordance with embodiments of the present disclosure.

The computing device 400 is in various implementations part of a greater system 401, such as an electrical, computing, and/or sensor system of the vehicle 100.

The computing device 400 can be implemented in any of a variety of ways, such as in the form of a server, within a mobile communications device, or other.

Although connections are not shown between all of the components illustrated in FIG. 4, the components can interact with each other to carry out system functions.

As shown, the computing device 400 includes a hardware-based memory, or computer-readable storage device 402, such as volatile medium, non-volatile medium, removable medium, and non-removable medium. The term computer-readable media and variants thereof, as used in the specification and claims, refer to tangible or non-transitory, computer-readable storage devices.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computing device 400 also includes a processing hardware unit 404 connected or connectable to the computer-readable storage device 402 by way of a communication link 406, such as a computer bus.

The processing hardware unit can include or be multiple processors, which could include distributed processors or parallel processors in a single machine or multiple machines. The processing hardware unit can be used in supporting a virtual processing environment. The processing hardware unit could include a state machine, application specific integrated circuit (ASIC), programmable gate array (PGA) including a Field PGA, or state machine. References herein to the processing hardware unit executing code or instructions to perform operations, acts, tasks, functions, steps, or the like, could include the processing hardware unit performing the operations directly and/or facilitating, directing, or cooperating with another device or component to perform the operations.

The computer-readable storage device 402 includes computer-executable instructions, or code 408. The computer-executable instructions 408 are executable by the processing hardware unit 404 to cause the processing hardware unit, and thus the computing device 400, to perform any combination of the functions described in the present disclosure.

The computing device 400 further comprises an input/output (I/O) device(s) 410, such as a wireless transceiver and/or a wired communication port. The processing hardware unit 404, executing the instructions 408, sends and receives information, such as in the form of, messages or packetized data, to and from sensors, switches (such as switch 440), the like or other components.

In some embodiments, such as when the system 400 is implemented within a vehicle 100, the system 400 includes or is connected to one or more local input/output devices 414, including at least one local input device 416 and/or at least one local output device 418. The inputs 416 can include user devices, vehicle sensors such as moisture sensors, road-slippage sensors, vehicle load sensors, light sensors, positioning system components (e.g., GPS receiver), speed sensors, camera systems, the like or other.

The outputs 418 can include the switch 440, the smart sensor-cover apparatus 130, and any automated components of the vehicle, such as an autonomous or semi-autonomous driving system. The inputs and/or the outputs 416, 418 can include applications such as social-media, music, traffic, and weather applications installed at or available to the vehicle 402 by wireless communications.

The input/output (I/O) devices 414 in various embodiments includes any type of suitable input/output 414, such as a wire-based and/or wireless I/Os to receive and send inputs and outputs.

The link 442 to the switch is shown separate from the I/Os 414, but can be part of the I/Os 414.

Functions of the computing device 400 are further described in other sections above and below, including in the Algorithms and Processes section.

VI. Concealed Mode of the Smart Sensor-Cover Apparatus—FIG. 5

Figure 5:
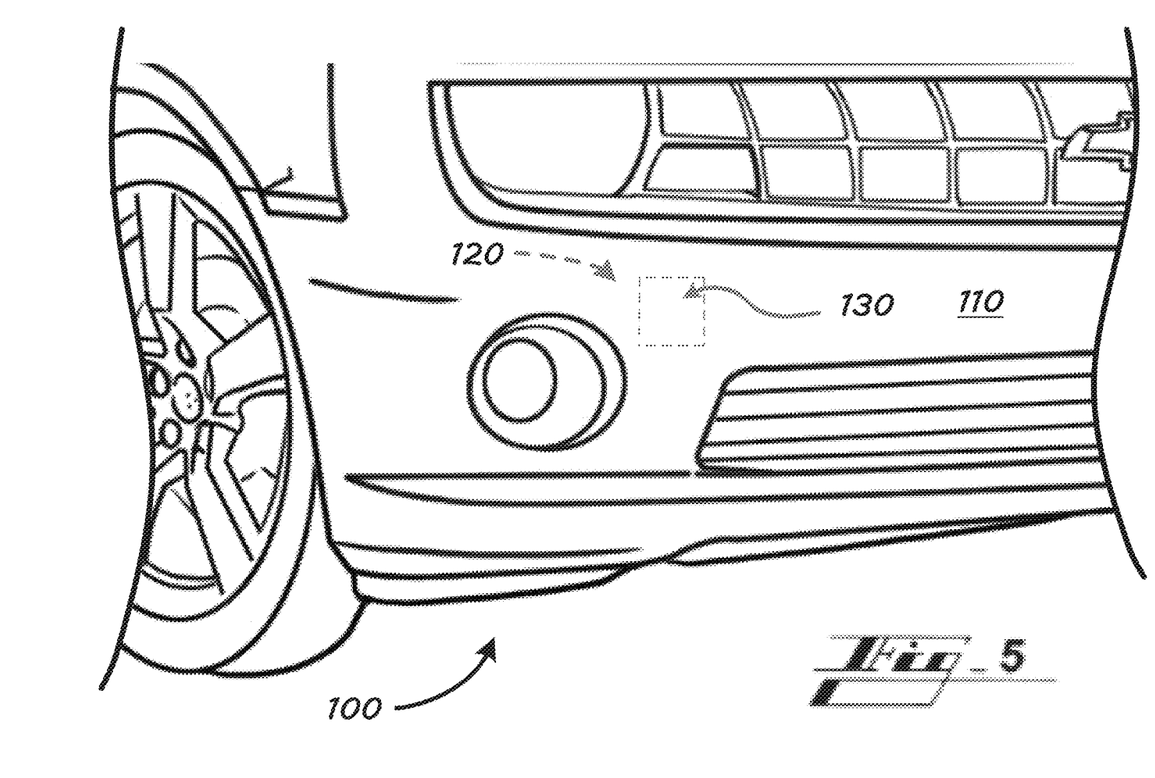
FIG. 5 shows a view, like FIG. 1, with the sensor-cover apparatus in a concealed, or hidden, mode.

FIG. 5 shows a view, like FIG. 1.

Except for the view of FIG. 5, the sensor-cover apparatus 130 in an opaque, or hidden, mode.

VII. Algorithms and Processes—FIG. 7

Figure 7:
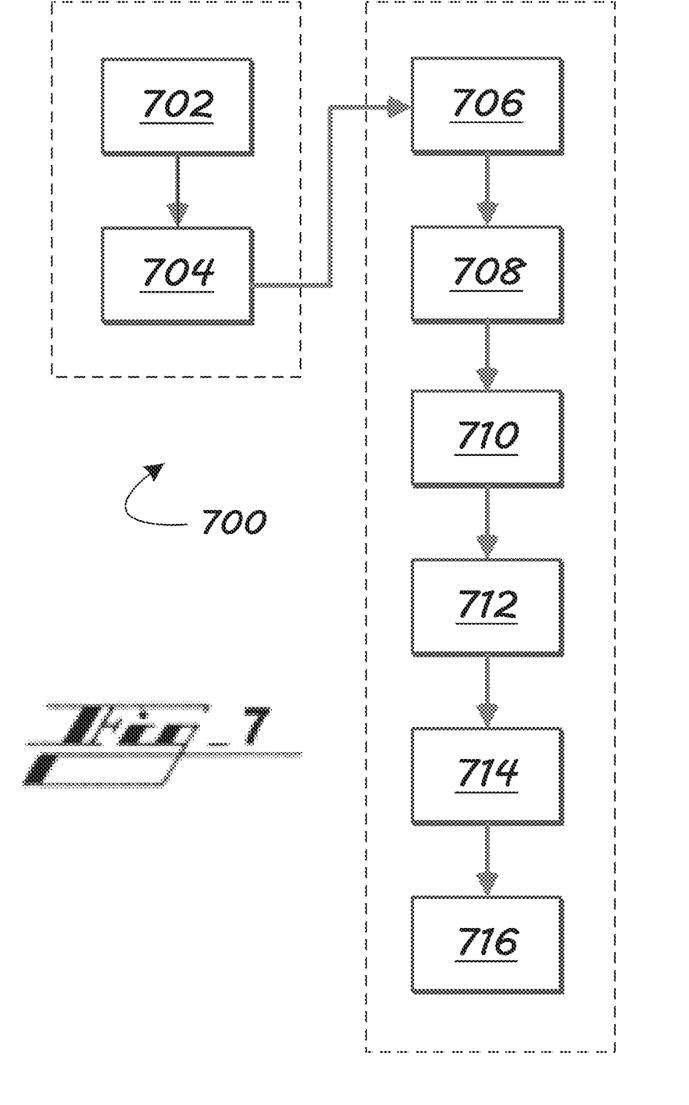
FIG. 7 shows processes of making, installing, and using the smart sensor-cover apparatus of the present technology.

FIG. 7 shows an example process, which can include an algorithm or routine, represented schematically by a flow 700, according to embodiments of the present technology. The flow is at times referred to as a process or method herein for simplicity.

Though a single process 700 is shown for simplicity, any of the functions or operations can be performed in one or more processes, routines, or sub-routines of one or more algorithms, by one or more devices or systems.

It should be understood that steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

In certain embodiments, some or all operations of the processes and/or substantially equivalent operations are performed by a computer processor, such as the hardware-based processing unit 404 of the vehicle 100 executing computer-executable instructions stored on a non-transitory computer-readable storage device of the respective device, such as the data storage device 402, and/or, for apparatus manufacturing or installation, by machinery such as robotics equipment controlled by such a processing hardware unit.

The process flow 700 shown includes manufacturing steps (702-704) and operation steps (706-716).

The process 700 starts and at step 702, the smart sensor-cover apparatus 130 is constructed, such as by computer-controlled robotics. The resulting apparatus 130 can include any of the components described herein, including those shown in FIGS. 2 and 3.

The formation can also first include formation of any of the described layers, or any of the layers can be obtained from another party.

The formation can then, thus include assembling the layers 210 adjacent each other, including insulation components described.

At step 704, the smart sensor-cover apparatus 130 is installed at a system such as the vehicle 100. Installation of the smart sensor-cover apparatus 130 in various embodiments includes positioning an outermost layer 218 of the apparatus 130 adjacent an outer surface 110 of the vehicle 100 or other system, and preferably generally or perfectly flush with the surface 110.

The flush positioning promotes some of the smart sensor-cover apparatus 130 functions described herein such as the concealing, cleaning, and the aerodynamics functions. The concealing function is promoted because the apparatus 130, when in the opaque mode, is less visible, or more concealed, when the outer surface 218 is flush with the surface 203 of the body 110.

The cleaning function can be promoted in various ways by the flush positioning, such as by avoiding material—dirt, rain, etc.—forming, being lodged, or settling at, in, or around the outer surface 218 if the outer layer 218 were recessed beneath the surface 203 of the body 110.

If moisture is spread toward the edges of the outer layer 218, it may spread off of the layer 218 if the layer was flush, but not if the layer were recessed.

If the layer 218 protrudes, it would be more conspicuous, less concealed, affecting aesthetics, and also negatively affecting aerodynamics.

Still, in some embodiments, a designer may chose to have at least some of the apparatus—e.g., outer layer(s)—to be recessed with respect to, or protrude with respect, to the adjacent host system (e.g., vehicle) outer surface.

The outer layer 218 can have any one or more of the cleaning, protecting, and self-mending configurations described herein.

The installation includes connecting the apparatus to a voltage source 430 by way of a controller, such as the controlling system 400, and switch, such as the switch 440, which may be connected to or part of the controller.

Once installed, the smart sensor-cover apparatus 130 is operated. The operations include a step 706 of providing, to the concealing controllable layer 216, a first predetermined input, such as a voltage of a level and/or at a timing determined appropriate by the controller for the desired concealing or revealing state.

The control in various embodiments includes a controller such as the computing system 400 controlling the switch 440 as described. The appropriate timing of input is in various embodiments based on the timing by which the sensor 130 is taking samples, e.g., images, such as in synchronization with the sensor 130 sensing.

Step 708 includes providing, to the wavelength-filtering controllable layer 212, a second predetermined input, such as a voltage of a level and/or at a timing determined appropriate by the controller for the desired Vis/NIR light filtering. The appropriate voltage level is in various embodiments based on the ambient lighting conditions outside of the vehicle 100. The level is selected by the controller to allow through wavelengths of light most favorable for sensor 120 operation under the current lighting conditions, such as light or dark (e.g., nighttime, shadows, in tunnels). In one embodiment, the control is based solely or partially on time of day, such as whether it is daytime or nighttime, or variances between down to any increment—e.g., dividing the time of a day into four parts, ten parts, twenty four parts, or down to the minute parts, for instance. A clock of the vehicle, of the apparatus, or of the sensor can be used for this. Lighting conditions can be sensed by a light sensor, for example.

As mentioned, benefits of the light or daytime mode include improved—e.g., more-accurate—color rendering by the sensor 120 based on the IR-filtered light allowed through to the sensor 120. Benefits of the dark or nighttime mode include rendering by the sensor 120 of a clearer image, than would otherwise be achievable, based on near-IR (NIR) light allowed to pass through to the sensor 120. The Vis/NIR light filter layer 212 is in various embodiments configured to, depending on the input voltage provided to it, allow through it only light having wavelength within pre-set corresponding wavelength ranges. While there may be more than two groups, while the groups can overlap, and while the groups can be separated at other points, in various embodiments the wavelengths are separated into two groups generally about 650 nm, a lower range 630 and an upper range 640 (FIG. 6).

As also mentioned, the infrared/visible-light filter layer 212 can be controlled to (i) perform IR filtering in light, or daytime, conditions, and (ii) allow IR light to pass in darker or night conditions to get more light in for clear image, with benefits of the light or daytime mode including improved—e.g., more-accurate—color rendering by the sensor 120 based on the IR-filtered light allowed through to the sensor 120, and benefits of the dark or nighttime mode include rendering by the sensor 120 of a clearer image based on IR light allowed to pass through to the sensor 120.

In application, the Vis/NIR light filter layer 212 is controlled to allow light in the first range 630 (FIG. 6) through to the sensor 120 during daylight or light times, while blocking light in the second range 640, and to allow light in both the first range 630 and the second range through to the sensor 120 during nighttime or darker times.

As mentioned, the Vis/NIR light filter layer 212 is controlled by a circuit or processor, based on the lighting conditions in the environment that is being sensed by the sensor 120. The processor and circuit components including a switch and voltage source are described further below, including in connection with FIG. 4.

Step 710 includes providing, to the polarizing controllable layer 214, a third predetermined input, such as a voltage of a level and/or at a timing determined appropriate by the controller for the desired polarization. The appropriate voltage level is in various embodiments based on the ambient lighting conditions outside of the vehicle 100. The level is selected by the controller to polarize light as it passes through to the sensor 120. A primary goal in various embodiments of the polarizing is to remove negative effects of glare. Lighting conditions can be sensed by a light or glare-sensing sensor, for example. The polarization layer 214 can also enhance the ability of the sensor 120 to detect particular road conditions that would otherwise be difficult to detect, or accurately characterize, such as some wet road-surface conditions.

Step 712 includes providing, to a cleaning controllable layer 218, a fourth predetermined input, such as a voltage of a level and/or at a timing determined appropriate by the controller for the desired cleaning condition. The cleaning controllable layer 218, in response to the input, heats up to melt any ice or snow contacting the fourth protecting layer. The level or timing in various embodiments is based on weather related conditions such as whether there is a freezing ambient temperature, freezing conditions (e.g., temperature and moisture or precipitation), other conditions indicating that snow or ice may be formed on or arrive at the apparatus, a weather report obtained indicating snow or ice conditions, the like, or other.

At step 714, the outer-most layer 218, whether configured to perform the other functions described for the layer (cleaning by heating, etc.), is configured and stimulated to perform the cleaning by heating function mentioned, keeps the layer 218 clean or at least more free from negative effects of surface moisture based on, e.g., its hydrophobic or super-hydrophilic surface structure.

The hydrophobic or super-hydrophilic surface is configured so that moisture, such as water, that contacts the surface either rolls away or spreads very thinly across the surface, promoting evaporation or drying out of the moisture. When spread thinly, versus forming droplets, the moisture is less obtrusive to light proceeding into and through the smart sensor-cover apparatus 130 on its way to the sensor 130. Very small droplets can together constitute unwanted fogging or otherwise blur the surface.

At step 716, the outer-most layer 218, whether also configured and stimulated to perform the other functions described for the layer (cleaning by heating, water repelling, etc.), automatically, without external input (such as voltage) self-mends, or self-heals, in response to being compromised, such as scratched or abrased, based on its structure.

Example surface structures for the layer 218 are described further above.

VIII. Select Advantages

Many of the benefits and advantages of the present technology are described above. The present section restates some of those and references some others. The benefits described are not exhaustive of the benefits of the present technology.

The present technology provides a solution for conflicts between design aesthetic requirements and active safety sensing requirements.

In various embodiments, the technology solves aesthetic concerns by concealing active safety sensors, and enhancing the active safety sensing capability by providing electrically controllable transparency, polarization, Vis/NIR filtering, and other functions.

The technology promotes active safety sensing by providing multiple functions by a single smart sensor-cover apparatus, for use over, or as part of, a sensor, without increasing base sensor cost, packaging size, etc.

The apparatus provides robust protection to expensive and fragile sensors.

The apparatus enables improved and more-flexible vehicle designing by allowing flush, aerodynamic, and visually concealable sensors, without sacrificing sensing capability.

Sensors can perform better when they receive quality-controlled input light, such as light that has been custom filtered for desired IR light, visible light, and polarization characteristics, for instance.

The polarizing layer mitigates effects of glare on the sensor and can also enhance the ability of the sensor to detect particular road conditions that would otherwise be difficult to detect, or accurately characterize, such as some wet road-surface conditions.

By cleaning functions, the outermost layer promotes safety actively by improving the amount and/or quality of light entering the sensor. This safety is in addition to the referenced active safety benefits provided by the other layers—e.g., Vis/NIR filtering layer and polarization layer—which improve, or tailor as desired, the light passing through the apparatus and on to the sensor. With better quality of light—e.g., without glare, or only with the wavelengths expected to be most useful under the present lighting conditions—the sensor can perform better and the vehicle operated more safely and accurately.

Benefits of having the protections afforded by at least the outer layer, in addition to protecting the sensor-cover apparatus, including possibly reducing the need, material, work, and general cost associated with needing to weatherproof the sensor and/or the cover apparatus can otherwise reduce the need, material, work, and general cost associated with packaging for the sensor 120 and/or the smart sensor-cover apparatus 130.

In some implementations, having a curved surface, such as slightly convex or slightly concave, improves function of this outermost layer. And the layer can be flush with the vehicle body and/or integrated into (e.g., connected directly to, with little to no apparent intervening gap, or formed as part of) the adjacent vehicle body. These structural aspects, such as the flushness, coating, layer, surface or lens curvature, integration or minimized gapping, for instance, can improve layer functions such as any of the hydrophobic or hydrophilic functions, the snow/ice melting functions, and the ease or effectiveness by which the outermost layer can be sprayed, brushed, wiped, or the like.

The present disclosure describes, by various embodiments, smart sensor-cover apparatus adjustable in various ways to improve vehicle performance, by enhanced sensing abilities, safety, and aesthetics. Sensing is improved by improving the type or quality of light that reaches the sensor, and in some cases when that light reaches the sensor.

IX. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to behind, beneath, upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A smart sensor-cover apparatus, for covering a sensor, comprising:
a plurality of controllable layers;
wherein each of the controllable layers is configured to be separately adjusted, based on an actuating input to the layer, to affect light incident on the controllable layer in a manner different than manners by which the light is affected by other of the controllable layers before arriving at the sensor.

2. The smart sensor-cover apparatus of claim 1 wherein the controllable layers include a wavelength-filtering controllable layer configured to, in response to a predetermined actuating input to the wavelength-filtering controllable layer, selectively filter out or allow through select wavelengths of infrared and/or visible light incident on the wavelength-filtering controllable layer.

3. The smart sensor-cover apparatus of claim 1 wherein the controllable layers include a polarizing controllable layer configured to, in response to a predetermined actuating input to the polarizing controllable layer, selectively polarize or allow through light incident on the polarizing controllable layer.

4. The smart sensor-cover apparatus of claim 1 wherein the controllable layers include a concealing controllable layer configured to, in response to a predetermined actuating input to the concealing controllable layer, change between (a) an opaque state, to partially or fully conceal the smart-sensor-cover apparatus, and so the sensor from view, and (b) a transparent state in which light can pass freely through the concealing controllable layer and on to the sensor.

5. The smart sensor-cover apparatus of claim 1 wherein:
the controllable layers include a cleaning controllable layer; and
the cleaning layer is configured to, in response to a predetermined actuating input, heat up to melt any ice or snow contacting the cleaning controllable layer.

6. The smart sensor-cover apparatus of claim 1 further comprising a cleaning layer, being an outermost layer of the smart sensor-cover apparatus and comprising a hydrophobic or hydrophilic outer surface.

7. The smart sensor-cover apparatus of claim 1 further comprising a protecting layer, being an outermost layer of the smart sensor-cover apparatus and configured to self-mend when scratched.

8. The smart sensor-cover apparatus of claim 1 further comprising an insulating component positioned between each set of adjacent controllable layers.

9. The smart sensor-cover apparatus of claim 8 wherein at least one of the insulating components includes a layer of glass or polycarbonate separating adjacent controllable layers.

10. The smart sensor-cover apparatus of claim 8 wherein the actuating input is a voltage input.

11. A smart sensor-cover apparatus, for covering a sensor, comprising:
a first controllable layer configured to, in response to a first predetermined input, selectively filter out or allow through select wavelengths of infrared and/or visible light incident on the first layer;
a second controllable layer configured to, in response to a second predetermined input, selectively polarize or allow through light incident on the second controllable layer;
a third controllable layer configured to, in response to a third predetermined input, change between an opaque state to partially or fully conceal the smart-sensor-cover apparatus and so the sensor from view, and a transparent state in which light can pass freely through the third controllable layer and on to the sensor; and
a fourth protecting layer, being an outermost layer of the smart sensor-cover apparatus, the fourth protecting layer having at least one characteristic selected from a group of characteristics consisting of:
being configured to self-mend when scratched;
being configured to, in response to a fourth predetermined input, heat up to melt any ice or snow contacting the fourth protecting layer, in which case the fourth protecting layer is a fourth controllable layer; and
having a hydrophobic or hydrophilic outer surface.

12. The smart sensor-cover apparatus of claim 11 further comprising an insulating component positioned between each set of adjacent controllable layers.

13. The smart sensor-cover apparatus of claim 11 wherein at least one of the insulating components includes a layer of glass or polycarbonate separating each adjacent controllable layer.

14. The smart sensor-cover apparatus of claim 11 wherein, for having the self-mending characteristic, the fourth protective layer comprises a polymer nanocomposite.

* * * * *